United States Patent
Kojima et al.

(10) Patent No.: US 7,391,443 B2
(45) Date of Patent: Jun. 24, 2008

(54) INFORMATION PROCESSING APPARATUS, INFORMATION PROCESSING METHOD, AND MEDIUM

(75) Inventors: Kiyonobu Kojima, Kanagawa (JP); Naoki Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 826 days.

(21) Appl. No.: 10/801,895

(22) Filed: Mar. 16, 2004

(65) Prior Publication Data
US 2004/0174440 A1 Sep. 9, 2004

Related U.S. Application Data

(63) Continuation of application No. 09/377,379, filed on Aug. 19, 1999, now abandoned.

(30) Foreign Application Priority Data
Aug. 21, 1998 (JP) ................................ 10-235235

(51) Int. Cl.
*H04N 5/76* (2006.01)
(52) U.S. Cl. .................................. 348/231.99
(58) Field of Classification Search ............. 348/231.99
See application file for complete search history.

(56) References Cited

U.S. PATENT DOCUMENTS

| | | | | |
|---|---|---|---|---|
| 3,664,247 | A | 5/1972 | Tellerman | 396/263 |
| 4,281,354 | A | 7/1981 | Conte | 360/5 |
| 5,134,472 | A | 7/1992 | Abe | 348/700 |
| 5,208,667 | A * | 5/1993 | Saunders | 348/452 |
| 5,272,657 | A | 12/1993 | Basehore et al. | 708/422 |
| 5,448,290 | A | 9/1995 | VanZeeland | 348/153 |
| 5,455,561 | A * | 10/1995 | Brown | 340/541 |
| 5,654,750 | A | 8/1997 | Weil et al. | 348/143 |
| 5,751,346 | A | 5/1998 | Dozier et al. | 348/153 |
| 5,877,897 | A | 3/1999 | Schofield et al. | 359/604 |
| 5,937,092 | A | 8/1999 | Wootton et al. | 382/192 |
| 5,987,154 | A | 11/1999 | Gibbon et al. | 382/115 |
| 5,996,023 | A | 11/1999 | Winter et al. | 709/253 |

(Continued)

FOREIGN PATENT DOCUMENTS

JP 11043016 A 2/1999

*Primary Examiner*—James M. Hannett
(74) *Attorney, Agent, or Firm*—Frommer Lawrence & Haug LLP; William S. Frommer; Paul A. Levy (57) ABSTRACT

An information processing apparatus, an information processing method and a medium which allow accurate control of an image pickup timing based on a result of image recognition with a simple construction. An image pickup section outputs picked up image data to an image recognition section and a delaying section. The image recognition section performs image recognition for the image data inputted thereto and, when it detects predetermined information from among the image data, outputs a trigger signal to an image fetching section to fetch an image. The delaying section delays the image data inputted thereto from the image recognition section to compensate for a delay corresponding to a time required for the image recognition by the image recognition section and outputs resulting image data to the image fetching section. The image fetching section fetches the image data inputted thereto from the delaying section in synchronism with the trigger signal inputted thereto from the image recognition section and outputs the fetched image data to the image storage section. The image storage section stores the image data outputted from the image fetching section.

10 Claims, 8 Drawing Sheets

U.S. PATENT DOCUMENTS

| | | | |
|---|---|---|---|
| 6,014,167 A | 1/2000 | Suito et al. | 348/169 |
| 6,050,369 A | 4/2000 | Leone et al. | 187/392 |
| 6,061,014 A | 5/2000 | Rautanen et al. | 342/52 |
| 6,081,606 A | 6/2000 | Hansen et al. | 382/107 |
| 6,097,429 A | 8/2000 | Seeley et al. | 348/154 |
| 6,163,257 A | 12/2000 | Tracy | 340/506 |
| 6,466,261 B1 | 10/2002 | Nakamura | 348/151 |
| 6,469,746 B1 | 10/2002 | Maida | 348/564 |
| 2002/0097145 A1 | 7/2002 | Tumey et al. | 340/425 |

\* cited by examiner

INFORMATION PROCESSING APPARATUS, INFORMATION PROCESSING METHOD, AND MEDIUM

This application is a continuation of Ser. No. 09/377,379, filed Aug. 19, 1999, now abandoned which application is hereby incorporated by reference.

BACKGROUND OF THE INVENTION

This invention relates to an information processing apparatus, an information processing method and a medium wherein an image pickup timing is controlled based on a result of image recognition.

Conventionally, an image pickup timing is inputted to a camera using various methods. According to a method, a user physically presses a shutter button. According to another method, an output signal of, for example, a sensor which detects sound, light or the like is inputted as a trigger signal to a camera.

In the method which employs a sensor for detecting sound, light or the like described above, a disturbance such as noise or scattered light sometimes hinders the sensor from outputting an accurate trigger signal, resulting in malfunction of the camera to which the trigger signal is inputted. Further, the sensor for detecting sound, light or the like must be provided in addition to an image pickup system of the camera. This complicates the construction of the camera.

SUMMARY OF THE INVENTION

It is an object of the present invention to provide an information processing apparatus, an information processing method and a medium which allow accurate control of an image pickup timing with a simple construction and an image pickup system can be also used as a sensor.

In order to attain the object described above, according to an aspect of the present invention, there is provided an information processing apparatus, comprising image pickup means for picking up an image of an image pickup object to produce image data, detection means for detecting a variation of the state of the image pickup object from within the image data produced by the image pickup means and generating a trigger signal, and storage means for storing the image data produced by the image pickup means in synchronism with the trigger signal generated by the detection means.

In the information processing apparatus, a variation of the state of an image pickup object is detected based on image data produced by the image pickup means, and a trigger signal is generated in response to the detection. Then, the image data are stored into the storage means in synchronism with the trigger signal. Consequently, the image pickup timing can be-controlled accurately. Further, such accurate control of the image pickup timing can be realized with a simplified construction because the image pickup means is used also as a sensor for detecting a variation of the state of the image pickup object.

According to another aspect of the present invention, there is provided an information processing method, comprising a first pixel value calculation processing step of calculating a sum total of pixel values of all pixels of image data for one frame fetched prior by a predetermined interval of time by image pickup means which picks up an image of an image pickup object, a second pixel value calculation processing step of calculating a sum total of pixel values of all of the pixels of image data for one frame fetched at a present point of time by the image pickup means, a detection processing step of calculating a difference value between the value calculated in the first pixel value calculation processing step and the value calculated in the second pixel value calculation processing step and, when the difference value is greater than a reference value set in advance, determining that a variation of the state has occurred with the image pickup object and generating a trigger signal, and a storage processing step of storing the image data for one frame fetched prior by the predetermined interval of time at a point of time when the trigger signal is generated in the detection processing step.

According to a further aspect of the present invention, there is provided a medium which causes a computer to execute an information processing program comprising a first pixel value calculation processing step of calculating a sum total of pixel values of all pixels of image data for one frame fetched prior by a predetermined interval of time by image pickup means which picks up an image of an image pickup object, a second pixel value calculation processing step of calculating a sum total of pixel values of all of the pixels of image data for one frame fetched at a present point of time by the image pickup means, a detection processing step of calculating a difference value between the value calculated in the first pixel value calculation processing step and the value calculated in the second pixel value calculation processing step and, when the difference value is greater than a reference value set in advance, determining that a variation of the state has occurred with the image pickup object and generating a trigger signal, and a storage processing step of storing the image data for one frame fetched prior by the predetermined interval of time at a point of time when the trigger signal is generated in the detection processing step.

In the information processing method and the medium, a sum total of pixel values of all pixels of image data for one frame fetched prior by a predetermined interval of time by the image pickup means which picks up an image of an image pickup object is calculated, and a sum total of pixel values of all of the pixels of image data for one frame fetched at a present point of time by the image pickup means is calculated. Then, a difference value between the values calculated in this manner is calculated. When the difference value is greater than the reference value set in advance, it is determined that a variation of the state has occurred with the image pickup object, and a trigger signal is generated. At the point of time when the trigger signal is generated, the image data for one frame fetched prior by the predetermined interval of time are stored. Consequently, the image pickup timing can be controlled accurately. Further, such accurate control of the image pickup timing can be realized with a simplified construction because the image pickup means is used also as a sensor for detecting a variation of the state of the image pickup object.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
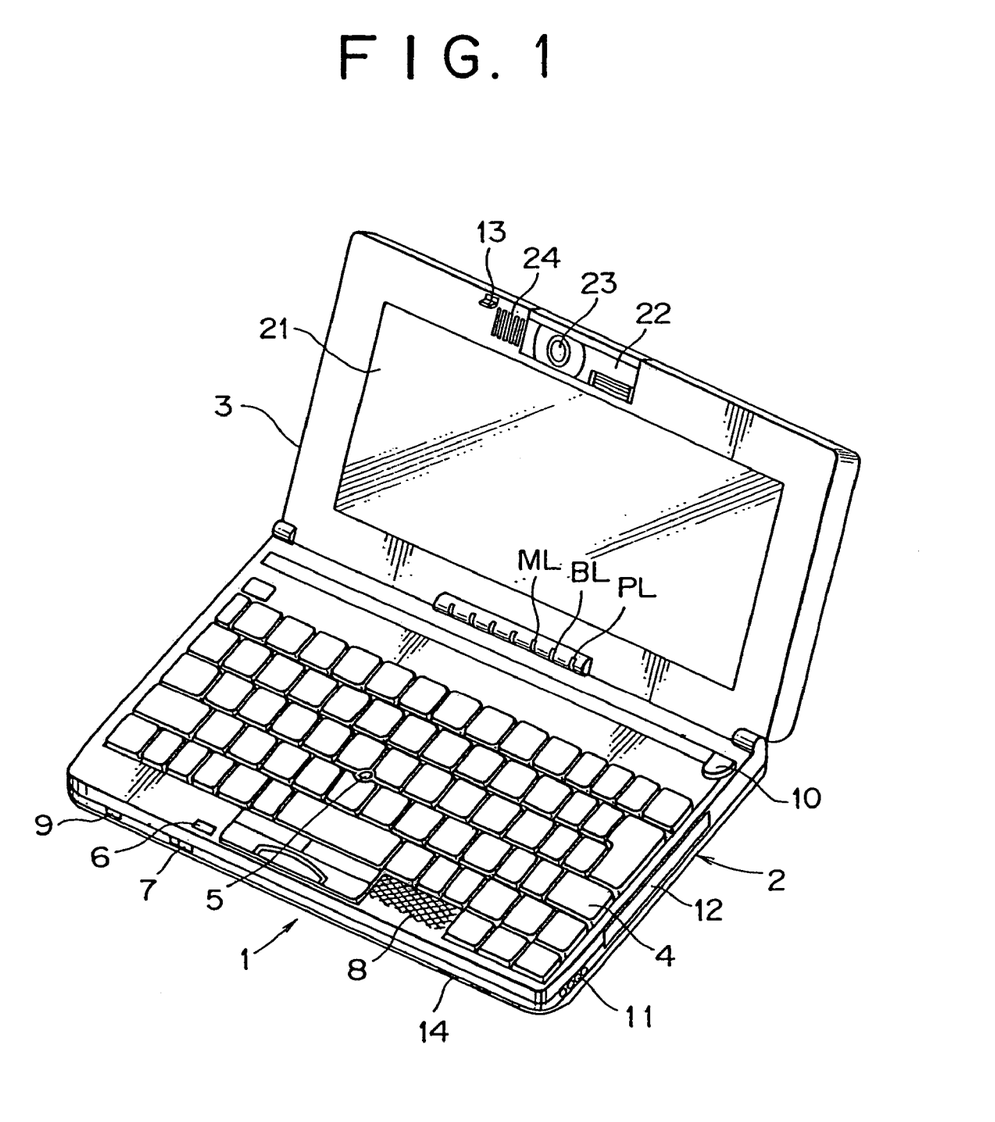
FIG. 1 is a perspective view showing a personal computer to which the present invention is applied.
Figure 2:
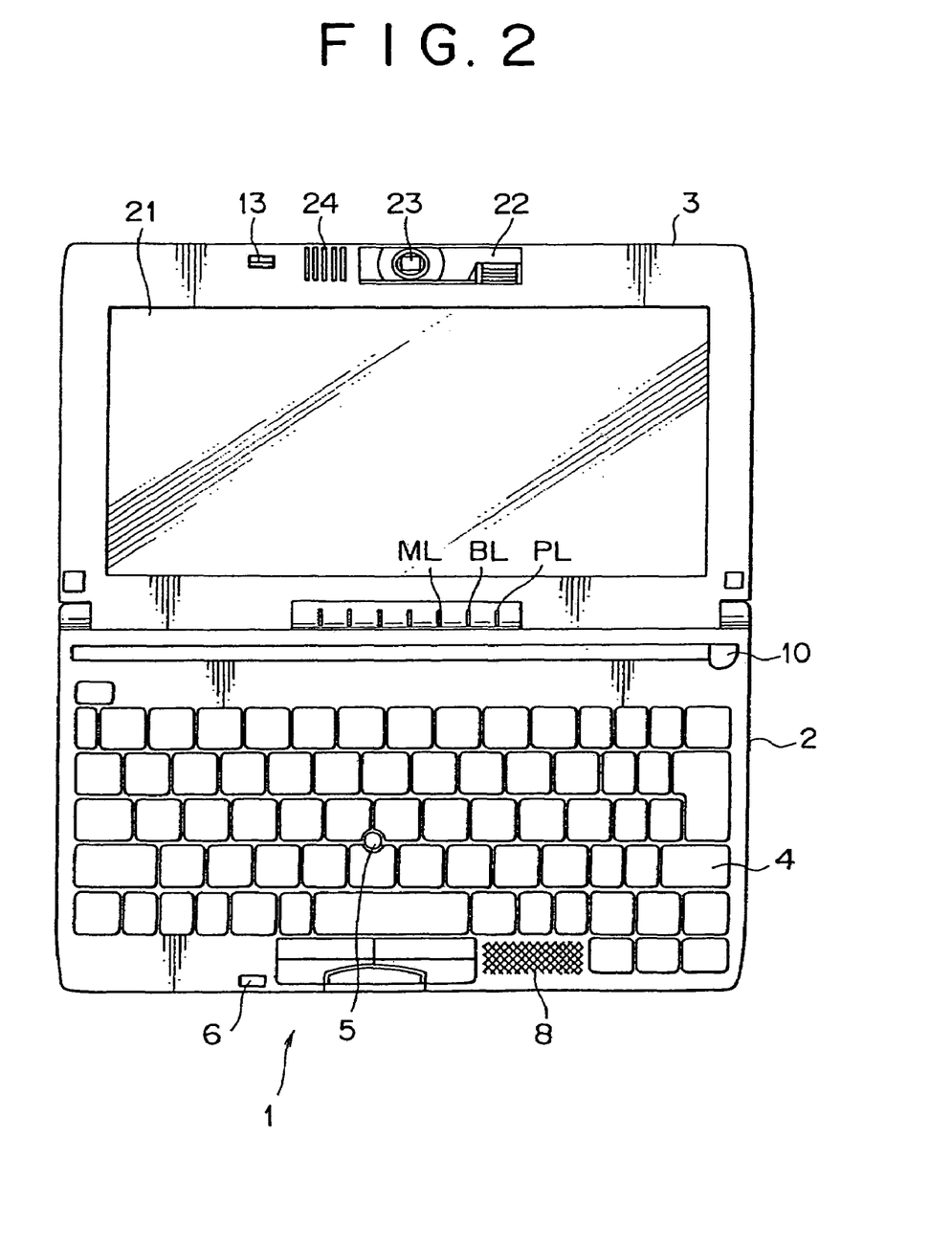
FIG. 2 is a plan view of the personal computer shown in FIG. 1.
Figure 3:
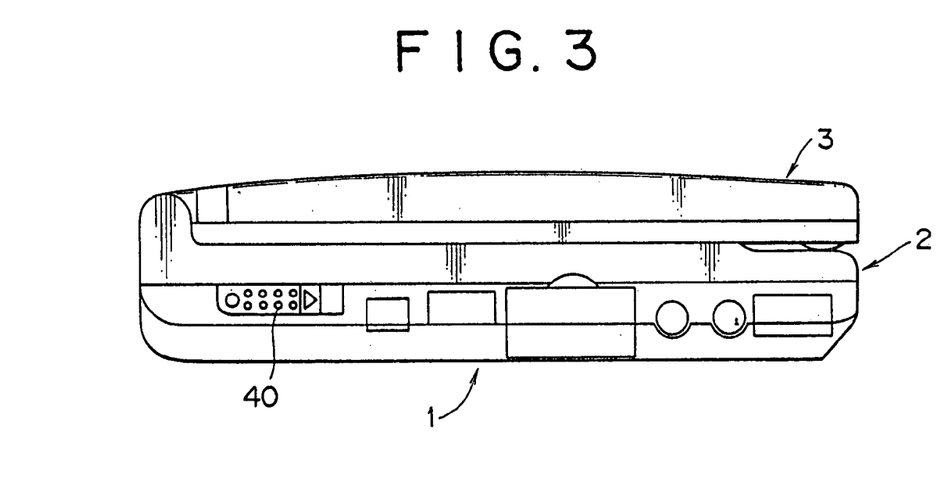
FIG. 3 is a left-hand side elevational view of the personal computer of FIG. 1 when the display section is closed with respect to the body.
Figure 4:
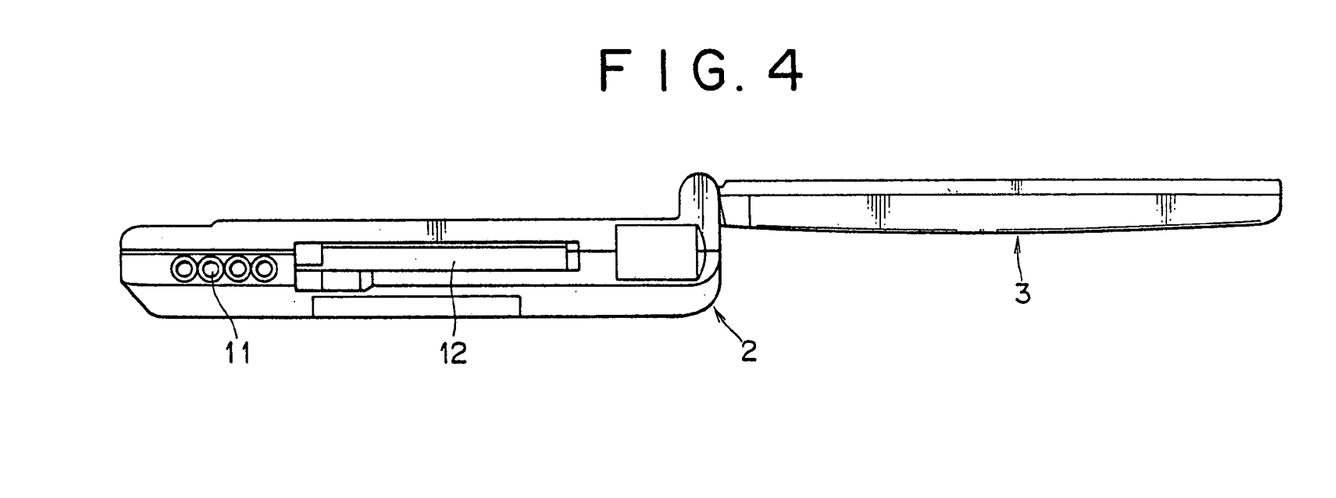
FIG. 4 is a right-hand side elevational view of the personal computer of FIG. 1 but when the display section is pivotally opened by 180 degrees with respect to the body.
Figure 5:
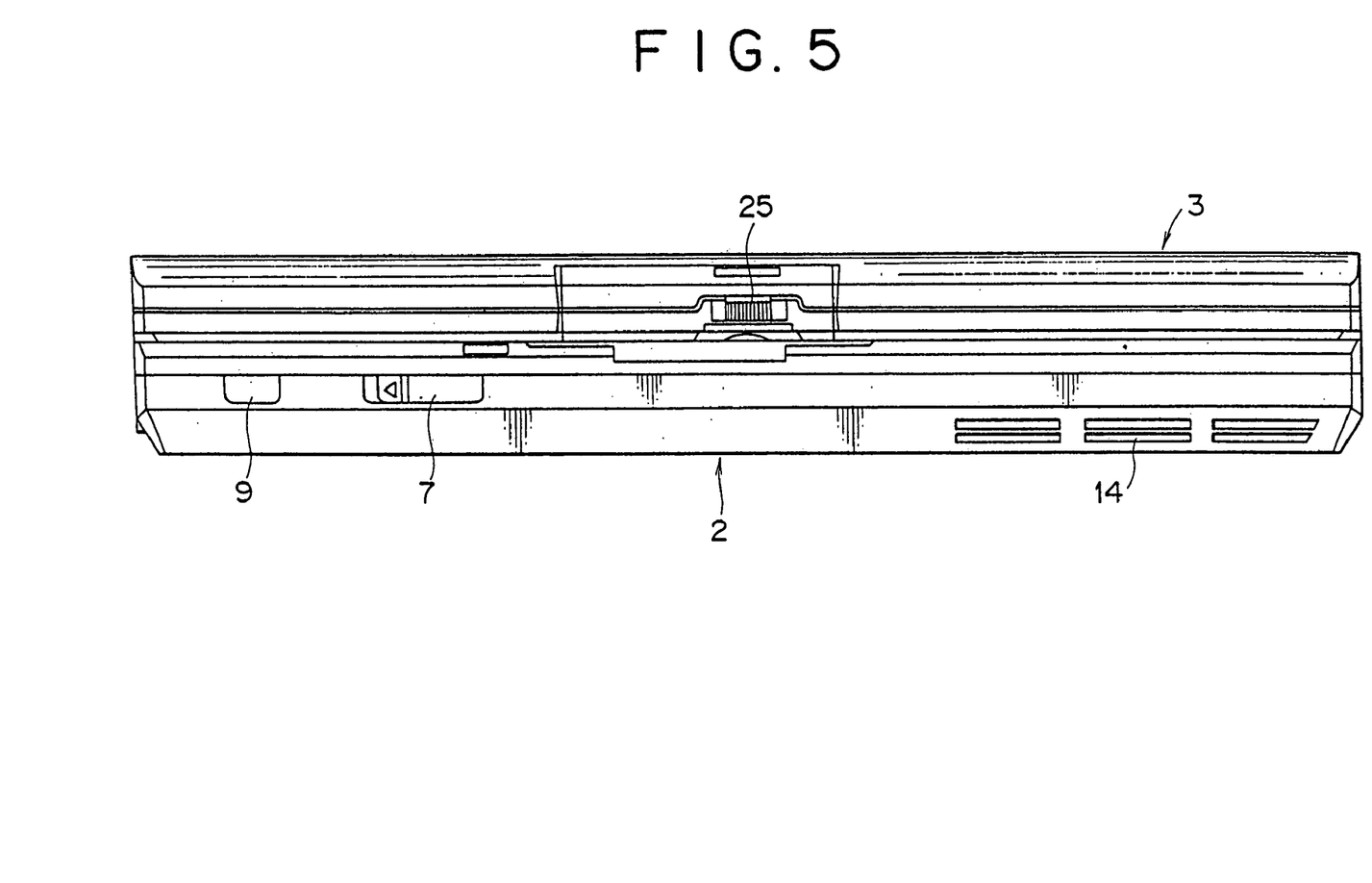
FIG. 5 is a front elevational view of the personal computer shown in FIG. 3.
Figure 6:
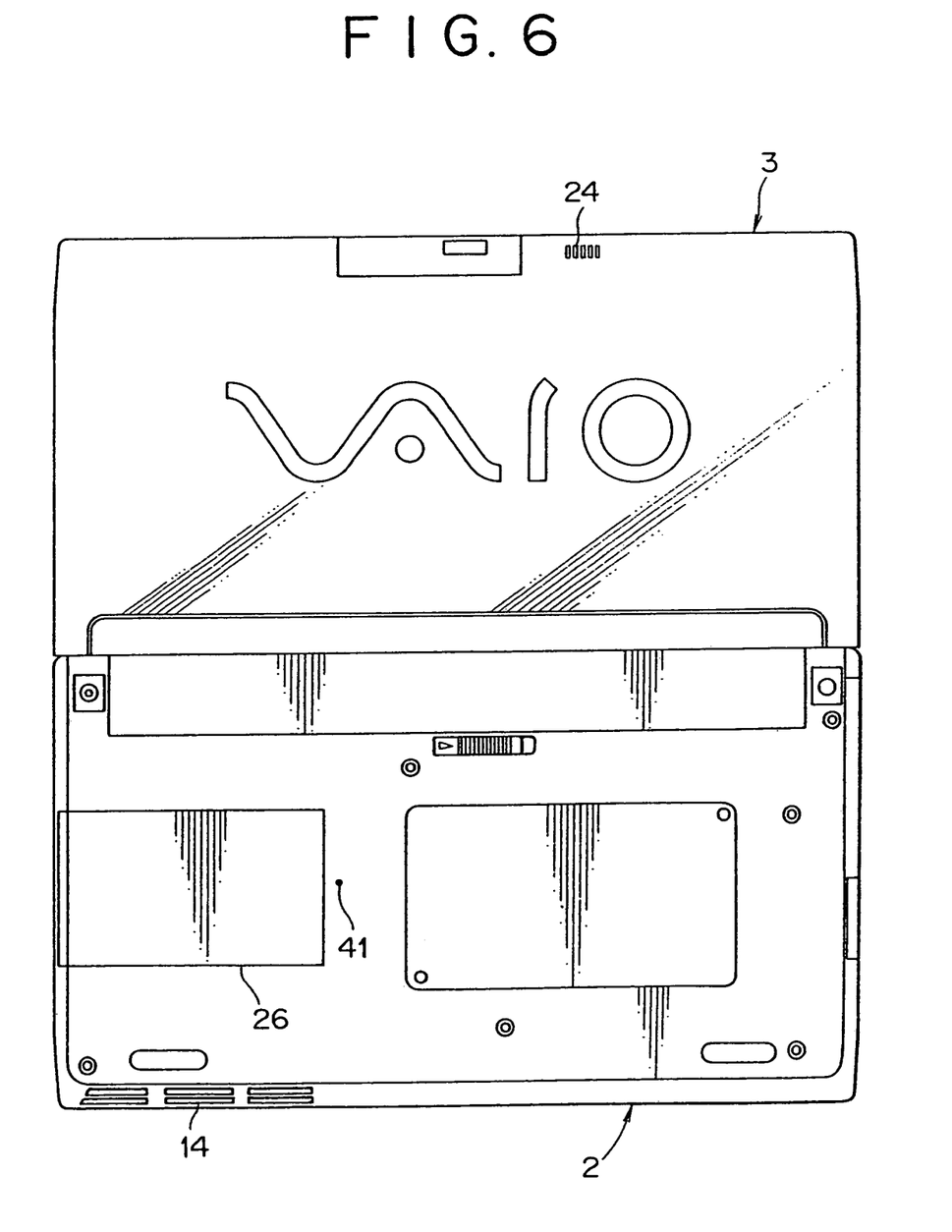
FIG. 6 is a bottom plan view of the personal computer shown in FIG. 4.

Referring first to FIGS. 1 to 6, there is shown a portable personal computer to which the present invention is applied. The personal computer generally denoted at 1 is a personal computer of the mini notebook type and includes, as basic components thereof, a body 2 and a display part 3 mounted for pivotal opening and closing movement with respect to the body 2 along an axis extending along a direction of the rear side of the body 2. FIG. 1 is a perspective view showing a personal computer 1 according to the present invention, the display part 3 is opened with respect to the body 2; FIG. 2 is a plan view of the personal computer shown in FIG. 1; FIG. 3 is a left-hand side elevational view showing the personal computer 1 with the display part 3 closed with respect to the body 2; FIG. 4 is a right-hand side elevational view showing the personal computer 1 with the display part 3 opened by 180 degrees with respect to the body 2; FIG. 5 is a front elevational view of the personal computer 1 shown in FIG. 3 and FIG. 6 is a bottom plan view of the personal computer 1 shown in FIG. 4.

A keyboard 4 and a stick type pointing device 5 are mounted on an upper face of the body 2. The keyboard 4 is operated to input various characters, symbols and so forth, and the stick type pointing device 5 is operated to move a mouse cursor and so forth. Also a speaker 8 which outputs sound and a shutter button 10 are provided on the upper face of the body 2. The shutter button 10 is operated to pick up an image of an object by means of a CCD video camera 23 which is provided on the display part 3.

A pawl 13 is provided at an upper end of the display part 3 in FIG. 1, and a hole 6 into which the pawl 13 is to be fitted is provided open at a position of the body 2 which opposes the pawl 13 when the display part 3 is closed with respect to the body 2 as shown in FIG. 3. A slide lever 7 is mounted on a front face of the body 2 for sliding movement in parallel to the front face of the body 2 to and from a position in which it engages with the pawl 13 fitted in the hole 6 to lock the pawl 13 and hence lock the display part 3 to its closed position. When the pawl 13 is unlocked from the slide lever 7, the display part 3 can be pivoted with respect to the body 2. A microphone 24 is mounted adjacent to the pawl 13. The microphone 24 can collect sound also from the back of the personal computer 1 as shown in FIG. 6.

Also a programmable power key (PPK) 9 is provided in the front face of the body 2. An air outlet 11 is formed on a right-hand side wall of the body 2 as shown in FIG. 4, and an air inlet 14 is formed at a lower portion of the front face of the body 2 as shown in FIG. 5. A slot 12 for receiving a PCMCIA (Personal Computer Memory Card International Association) card (PC card) is formed on the right side of the air outlet 11.

An LCD (Liquid Crystal Display) 21 for displaying an image thereon is provided on the front face of the display part 3, and an image pickup part 22 is mounted at an upper end of the LCD 21 in FIG. 1 for pivotal motion with respect to the display part 3. In particular, the image pickup part 22 is mounted for turning movement to any position within a range of 180 degrees from the direction of the LCD 21 to the opposite direction. The CCD video camera 23 is mounted on the image pickup part 22.

A power supply lamp PL, a battery lamp BL, a message lamp ML and other necessary lamps which may be formed from light emitting diodes (LEDs) are provided at lower portions of the display part 3 in FIG. 1 adjacent to the body 2. It is to be noted that reference numeral 40 shown in FIG. 3 denotes a power supply switch provided on the left side face of the body 2, and 25 shown in FIG. 5 denotes an adjustment ring for adjusting the focus of the CCD video camera 23. Further, reference numeral 26 shown in FIG. 6 denotes a lid which covers over an opening through which an add-on memory is to be loaded into the body 2, and reference numeral 41 denotes a small hole into which a pin for unlocking the locking pawl of the lid 26 is to be inserted.

Figure 7:
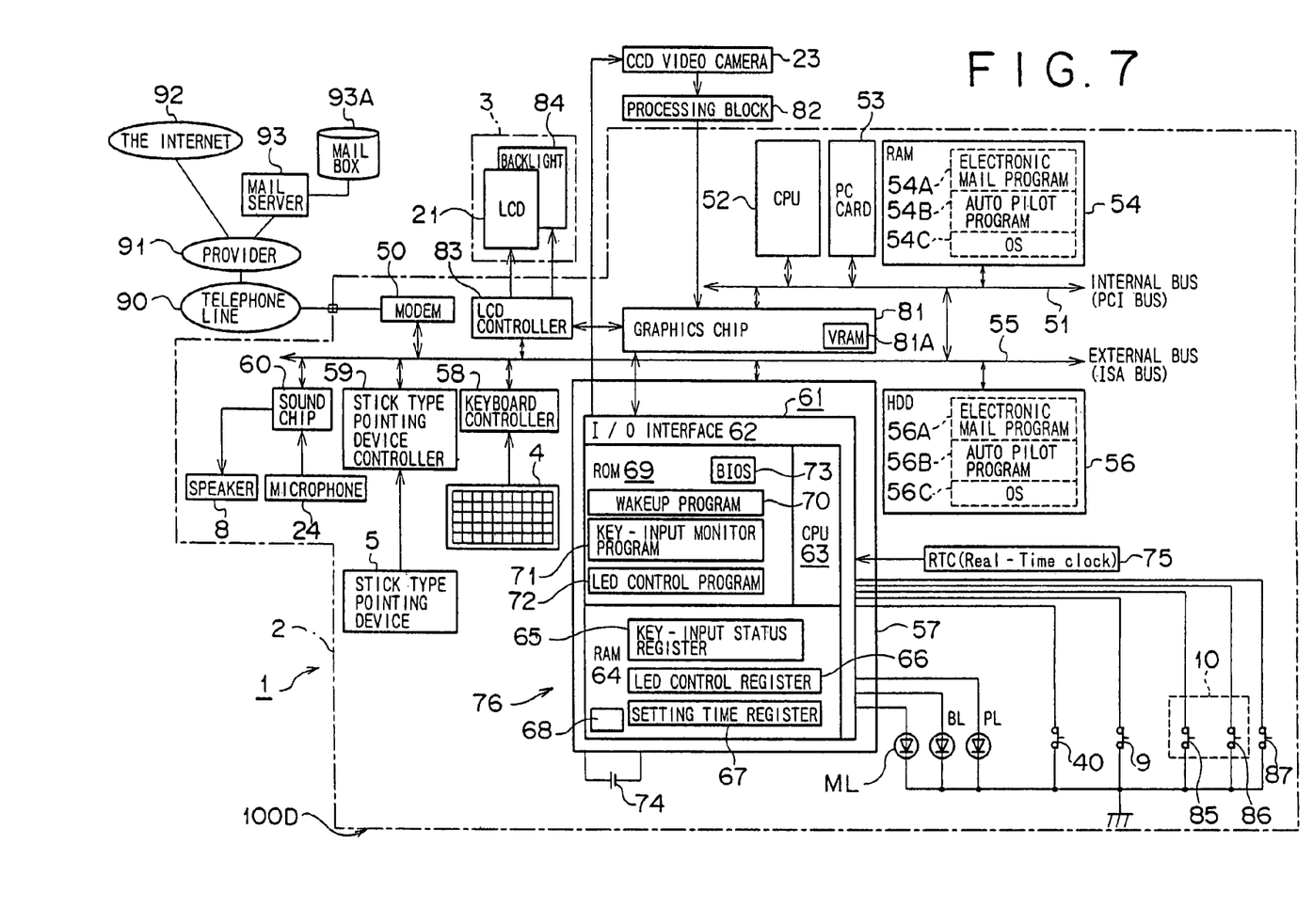
FIG. 7 is a block diagram showing an electric circuit of the personal computer of FIG. 1.

FIG. 7 shows an internal structure of the personal computer 1. Referring to FIG. 7, a CPU (Central Processing Unit) 52, a PC card 53 which is loaded into the personal computer 1 when necessary, a RAM (Random Access Memory) 54 and a graphics chip 81 are connected to an internal bus 51. The internal bus 51 is connected to an external bus 55, and a hard disk drive (HDD) 56, an I/O (input/output) controller 57, a keyboard controller 58, a stick type pointing device controller 59, a sound chip 60, an LCD controller 83, a modem 50 and other required devices are connected to the external bus 55.

The CPU 52 serves as a controller for controlling various functions. The PC card 53 is suitably loaded in order to add an optional function to the personal computer 1.

The RAM 54 has, at a point of time when start-up is completed, an electronic mail program (application program) 54A, an auto pilot program (application program) 54B and an OS (operating system; basic program) 54C stored therein. The programs mentioned are transferred from the HDD 56 to the RAM 54 upon start-up.

The electronic mail program 54A is a program for sending or receiving a communication message through a network to or from a communication line such as a telephone line. The electronic mail program 54A has an in-coming mail capturing function as a particular function. The in-coming mail capturing function executes processing of checking a mail box 93A of a mail server 93 for a mail addressed to that user and, if such a mail is found, capturing the same.

The auto pilot program 54B is a program for successively starting a plurality of processes (or programs) set in advance in a predetermined order.

The OS (basic program software) 54C controls basic operation of the computer represented by the Windows98 (trademark).

Meanwhile, the hard disk drive (HDD) 56 of the external bus 55 side has an electronic mail program 56A, an auto pilot program 56B and an OS (basic program software) 56C stored therein. The OS 56C, auto pilot program 56B and electronic mail program 56A in the hard disk drive 56 are successively transferred to and stored into the RAM 54 in a procedure of start-up (boot-up) processing.

The I/O controller 57 includes a microcontroller 61 provided with an I/O interface 62. The microcontroller 61 includes, in addition to the I/O interface 62, a CPU 63, a RAM 64 and a ROM 69 which are connected to each other. The RAM 64 includes a key-input status register 65, an LED (light emitting diode) control register 66, a setting time register 67, and a register 68. The setting time register 67 is used to start operation of a start sequence controller 76 when a time (start-up condition) set in advance by the user comes. The register 68 stores a correspondence between a combination (start-up condition) of operation keys set in advance and an application program to be started up. When the stored combination of operation keys is inputted by the user, the stored application program (for example, an electronic mail) is started up.

The key-input status register 65 stores an operation key flag when the programmable power key (PPK) 9 for single-touch operation is pressed. The LED control register 66 controls the turn-on/off of the message lamp ML which indicates a start-up condition of an application program (electronic mail program) stored in the register 68. The setting time register 67 accepts setting of an arbitrary time.

A backup battery 74 is connected to the microcontroller 61 so that stored values of the registers 65, 66 and 67 may be maintained even when the power supply to the body 2 is off.

The ROM 69 in the microcontroller 61 has a wakeup program 70, a key-input monitor program 71 and an LED control program 72 stored in advance therein. The ROM 69 is formed from, for example, an EEPROM (electrically erasable and programmable read only memory). The EEPROM is also called flash memory. Further, an RTC (Real-Time Clock) 75 which normally counts the present time is connected to the microcontroller 61.

The wakeup program 70 in the ROM 69 is a program for checking based on the present time data supplied thereto from the RTC 75 whether or not a time set in advance in the setting time register 67 comes and starts up a predetermined process (or program) or they like when the set time comes. The key-input monitor program 71 is a program for normally supervising whether or not the PPK 9 is pressed by a user. The LED control program 72 is a program for controlling the turn-on/off of the message lamp ML.

The ROM 69 further has a BIOS (Basic Input/Output System) 73 written therein. The BIOS is a basic input/output system and is a software program for controlling the transfer (input/output) of data between an OS or application software and a peripheral equipment such as display unit, a keyboard, or a hard disk drive.

The keyboard controller 58 connected to the external bus 55 controls inputting from the keyboard 4. The stick type pointing device controller 59 controls inputting of the stick type pointing device 5.

The sound chip 60 fetches an input from the microphone 24 or supplies an audio signal to the speaker 8.

The modem 50 can be connected to a communication network such as the Internet 92 or the mail server 93 through a public telephone line 90 or an Internet service provider 91.

The graphics chip 81 connected to the internal bus 51 receives, as input data thereto, image data picked up by the CCD video camera 23 and processed in a processing block 82. The graphics chip 81 stores video data inputted thereto from the CCD video camera 23 through the processing block 82 into a VRAM (video RAM) 81A built therein and reads out and outputs the data suitably to the LCD controller 83. The LCD controller 83 outputs the image data supplied thereto from the graphics chip 81 to the LCD 21 so that they may be displayed on the LCD 21. A backlight 84 illuminates the LCD 21 from behind.

The power supply switch 40 is operated to switch the power supply on or off. A half press switch 85 is switched on when the shutter button 10 is pressed into a half-pressed condition. A full press switch 86 is switched on when the shutter button 10 is pressed into a full-pressed condition. A reversal switch 87 is switched on when the image pickup part 22 is turned by 180 degrees (when the CCD video camera 23 is turned to a direction to pick up an image on the opposite side to the LCD 21).

In the personal computer 1 described above, image data fetched by the CCD video camera 23 are stored into the VRAM 81A built in the graphics chip 81. The image data stored in the VRAM 81A are captured (stored into the hard disk 56) at the timing when the shutter button 10 is fully pressed as a hardware switch by a user (when the full press switch 86 is turned on) or when, as a software switch, predetermined information is detected from within the image data stored in the VRAM 81A by an image recognition application which is operating in the personal computer 1.

Figure 10:
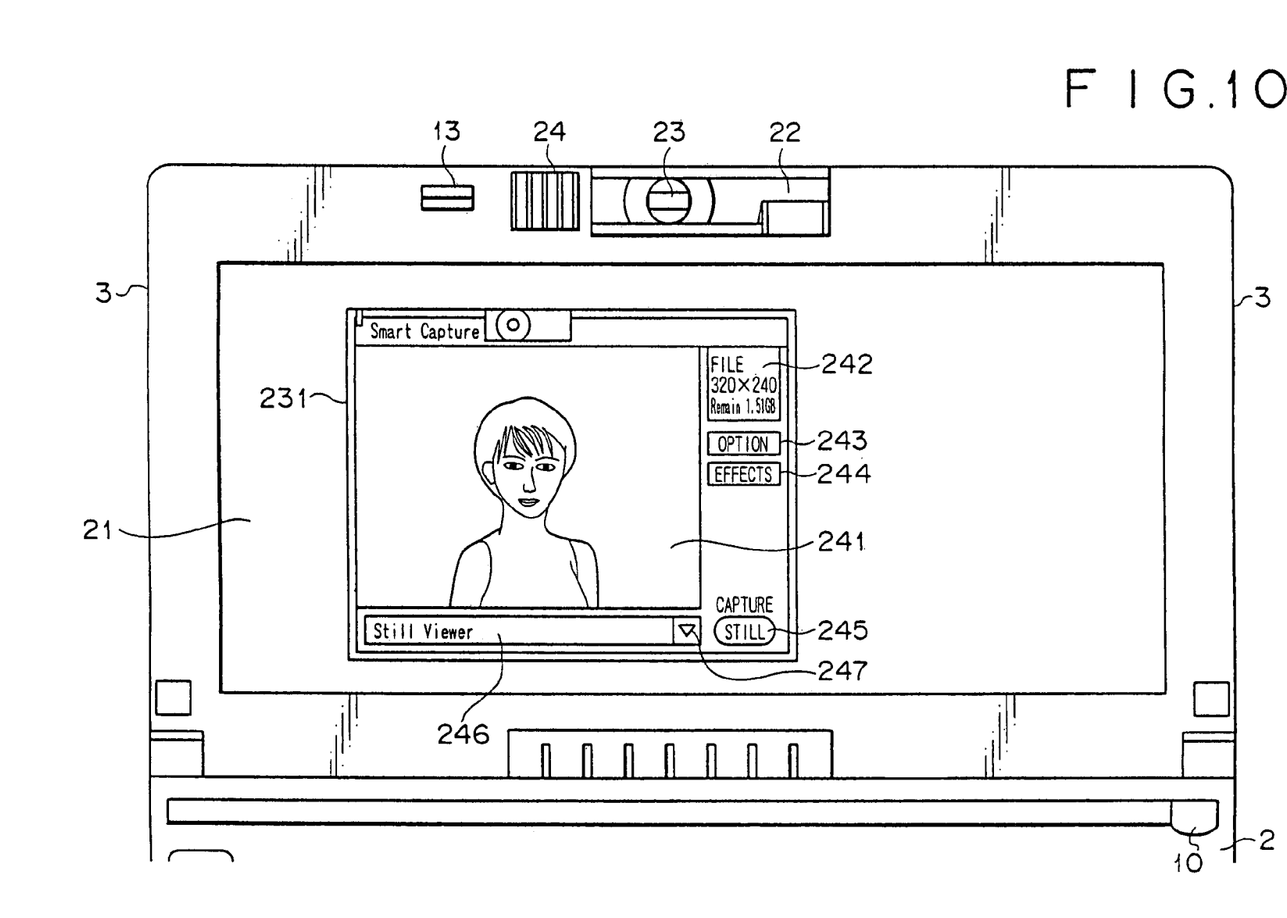
FIG. 10 is a schematic view showing an example of a display of the personal computer of FIG. 1 according to an image pickup application program.

FIG. 10 shows a particular example of a display of an image pickup application program as the image recognition application mentioned above. The following description is given of SMART CAPTURE (trademark) as an example that works as the image pickup application program for capturing an image through the CCD video camera 23.

When SMART CAPTURE is operating, the CPU 52 instructs the graphics chip 81 to execute the processing for displaying the image picked up by the CCD video camera 23 on the LCD 21. Namely, the image data picked up by the CCD video camera 23 are processed by the processing block 82 in a predetermined manner and supplied to the graphics chip 81 through a ZV port. The graphics chip 81 temporarily stores the received image data into the VRAM 81A and reads and outputs the stored image data to the LCD controller 83. The LCD controller 83 outputs the received image data to the LCD 21 (a finder screen 241) so as to be displayed on the same. Consequently, the image picked up by the CCD video camera as shown in FIG. 10, for example, is displayed as a motion picture in a window 231 of SMART CAPTURE.

As shown in FIG. 10, the finder screen 241 is arranged in the window 231. The image picked up by the CCD video camera 23 is displayed in the finder screen 241. A status display section 242 displays the status information of the image displayed in the finder screen 241. For example, in the still picture pickup mode, a picture quality mode (FINE), a picture size (320 ×240), and a hard disk free space (Remain 1.51 GB) are displayed. In the motion picture pickup mode, a maximum recording time length, a recording time at present, and a picture size are displayed.

An option button 243 is operated to designate an image pickup mode or a like mode. An effect button 244 is operated to impart an effect to the picked up image. A capture button 245 has a function equivalent to that of the mechanical shutter button 10 (refer to FIG. 1) and operated to pick up an image. The word on the capture button 245 is "STILL" for still picture pickup and "VIDEO" for motion picture pickup.

An application selector menu 246 displays the name of an application to be used to process the picked up image. In the state shown in FIG. 10, Still Viewer (trademark), which is an application program for still image reproduction, is selected, and SMART CAPTURE is in the state for supplying the obtained image data to Still Viewer. Therefore, "Still Viewer" is displayed on the application selector menu 246. A button 247 to the right of the application selector menu 246 is operated to switch between applications.

Figure 8:
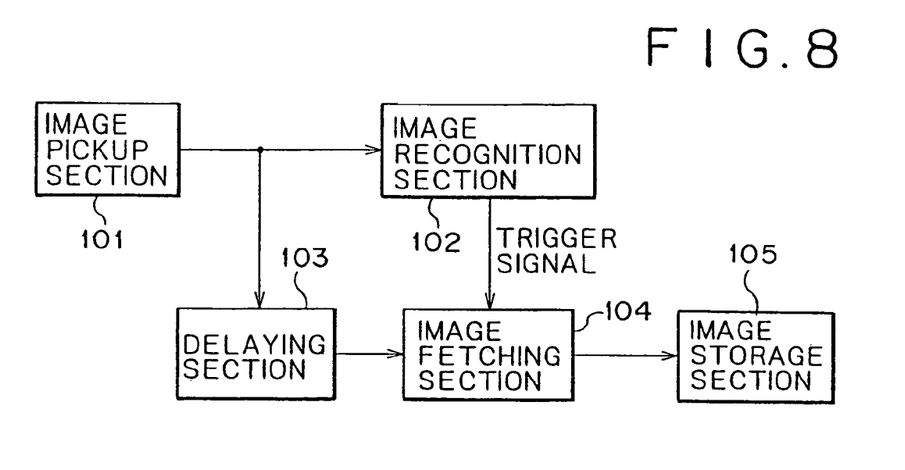
FIG. 8 is a block diagram showing a construction of components of the personal computer of FIG. 1 which perform image pickup processing.

FIG. 8 illustrates a functional construction of the image recognition application. Referring to FIG. 8, an image pickup section 101 (which corresponds to the CCD video camera 23 of FIG. 7) picks up an image and outputs resulting image data to an image recognition section 102 and a delaying section 103.

The image recognition section 102 performs image recognition for the image data inputted thereto from the image pickup section 101. If the image recognition section 102 detects desired information from within the image data, then it outputs a trigger signal to an image fetching section 104 to instruct the image fetching section 104 to fetch an image. The image recognition section 102 detects, as the desired information mentioned above, for example, a motion vector of an object such as a person who moves across the screen, an intensity variation of light such as that when a lamp is turned on or off, or a particular image pattern such as the face of a person. The information to be detected by the image recognition section 102 is set by a user in advance.

The delaying section 103 delays the image data inputted thereto from the image pickup section 101 to compensate for a delay of time required for the image recognition by the image recognition section 102 and outputs the delayed image data to the image fetching section 104. The image fetching section 104 fetches the image data inputted thereto from the delaying section 103 in response to the trigger signal inputted thereto from the image recognition section 102 and outputs the fetched image data to an image storage section 105 (which corresponds to the hard disk 56 of FIG. 7). The image storage section 105 stores the image data outputted from the image fetching section 104.

Now, image pickup processing of the image recognition application having the construction described above is described with reference to FIG. 9 in connection with an example wherein the image recognition section 102 is set so as to detect an intensity variation of light. When a user wants, for example, to record image data of a certain room picked up when a lamp in the room is turned on or off, the user will set the image recognition section 102 so that it detects an intensity variation of light. In step S1, the image pickup section 101 starts image pickup of the room and outputs the picked up image data to the image recognition section 102 and the delaying section 103. Accordingly, real time image data obtained by picking up an image of the room are successively inputted to the image recognition section 102 and the delaying section 103.

Figure 9:
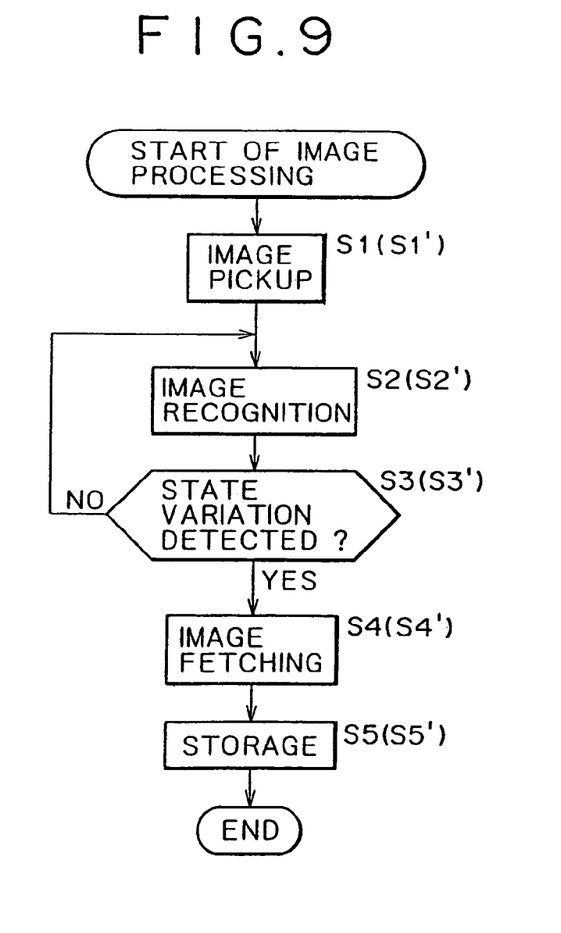
FIG. 9 is a flow chart illustrating image pickup processing of the personal computer of FIG. 1

In step S2, the image recognition section 102 extracts a luminous intensity (brightness value) of a pixel at a predetermined position for each predetermined number of frames (for example, for each 10 frames) from among the image data inputted thereto from the image pickup section 101, and calculates a difference of the brightness value from another brightness value of the same pixel in another frame prior by 10 frames in time.

In step S3, the image recognition section 102 determines whether or not the difference in brightness value calculated in step S2 is greater than a predetermined value (whether the lamp has been turned on or off). The processes in steps S2 and S3 are repeated until it is determined in step S3 that the difference in brightness value is greater than the predetermined value. If it is determined in step S3 that the difference in brightness value calculated in step S2 is greater than the predetermined value, then the control advances to step S4.

In the meantime, the delaying section 103 delays the image data inputted thereto by a time equal to the time required for the processes of the image recognition section 102 in steps S2 and S3 and outputs the delayed image data to the image fetching section 104. The delaying section 103 adjusts the delay time in response to the information detected by the image recognition section 102.

In step S4, the image recognition section 102 outputs a trigger signal to the image fetching section 104. The image fetching section 104 fetches the image data inputted thereto from the delaying section 103 in synchronism with the trigger signal inputted thereto from the image recognition section 102, and outputs the still image data to the image storage section 105. In step S5, the image storage section 105 stores the still image data inputted thereto from the image fetching section 104.

It is to be noted that the delaying section 103 adjusts its delay type also in response to the type of information detected by the image recognition section 102. For example, when the image recognition section 102 detects an intensity of light, a trigger signal is outputted when the lamp is turned on from an off state. However, it is meaningless if image data of the dark room after the lamp is turned off are recorded. Therefore, the delay time is adjusted so that image data immediately before the lamp is turned off may be recorded.

Subsequently, another image pickup process of the image recognition application described hereinabove with reference to FIG. 8 is described with reference to FIG. 9 in connection with a case wherein the image recognition section 102 is set so as to detect a variation of the state of an image pickup object. For example, when a user wants to record image data of the upper part of the body of the user picked up when the user moves the head in front of the video camera 23, the user will change the setting of the SMART CAPTURE as the image pickup application program described above so that the image recognition section 102 may detect a variation of the state of the image pickup object. In step S1', the image pickup section 101 starts image pickup of the upper part of the body of the user and outputs resulting image data to the image recognition section 102 and the delaying section 103. Accordingly, picked up real time image data of the upper part of the body of the user are successively inputted to the image recognition section 102 and the delaying section 103.

In step S2', the image recognition section 102 calculates a sum total of pixel values of all pixels of image data for one frame for each predetermined number of frames (for example, for each 10 frames) from among the image data inputted thereto from the image pickup section 101. Then, the image recognition section 102 calculates a difference value of the sum total of the pixel values of all of the pixels of the image data for one frame fetched at the present point of time from the sum total of pixel values of image data for one frame fetched prior by 10 frames in time (prior by a predetermined time).

In step S3', the image recognition section 102 determines whether or not the difference value calculated in step S2' is greater than a reference value set in advance (whether or not the user has moved the head) The processes in steps S2' and S3' are repeated until it is determined in step S3' that the difference value is greater than the predetermined reference value set in advance. If it is determined in step S3' that the difference value calculated in step S2' is greater than the predetermined reference value, then the control advances to step S4'.

In the meantime, the delaying section 103 delays the image data inputted thereto from the image recognition section 102 by a time required for the processes of the image recognition section 102 in steps S2' and S3' and outputs the delayed image data to the image fetching section 104. The delaying section 103 adjusts its delay time in response to the information detected by the image recognition section 102.

In step S4', the image recognition section 102 determines, from the fact that the difference value calculated in step S2' is greater than the predetermined reference value, that a variation of the state has occurred with the image pickup object (the user has moved the head) and generates and outputs a trigger signal to the image fetching section 104. The image fetching section 104 fetches the image data inputted thereto from the delaying section 103 in synchronism with the trigger signal inputted thereto from the image recognition section 102, and outputs the fetched still image data to the image storage section 105. In step S5', the image storage section 105 stores the still image data inputted thereto from the image fetching section 104.

It is to be noted that the delaying section 103 adjusts its delay time also in response to the type of information detected by the image recognition section 102. For example, when the image recognition section 102 detects an event of a variation of the state occurring with the image pickup object such as a movement of the head of the user, a trigger signal is outputted after the user has moved the head. However, it is meaningless if image data are recorded after the image of the user has disappeared from the frame. Therefore, the delay time is adjusted so that image data immediately before the user moves the head may be recorded.

In this manner, in the personal computer 1 of the present embodiment, recording of an image can be controlled based on arbitrary information detected from image information. Therefore, the present invention can be applied, for example, to a monitor camera for burglar prevention.

Further, while, in the personal computer 1 of the present embodiment, a still picture is stored in synchronism with the trigger signal, motion picture data may alternatively be recorded for a predetermined period of time in synchronism with the trigger signal.

It is to be noted that a computer program for causing a computer to execute such processes as described above can be provided to a user not only as a medium in the form of an information recording medium such as a magnetic disk or a CD-ROM but also through a network providing medium such as the Internet or a digital satellite.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:
   image pickup means for picking up an image of an image pickup object to produce image data;
   a delay means for delaying transmittal of the image data received from the image pickup means by a predetermined delay time;
   detection means for detecting a predetermined variation in the image pickup object from within the image data produced by said image pickup means and generating a trigger signal in response to the variation detection, wherein the detection means and the delay means both receive the image data at substantially the same time;
   an image fetching means for fetching, in response to receiving the trigger signal, image data from the delay means; and
   storage means for storing the image data fetched by the fetching means,
   wherein the delay means adjusts the predetermined delay time in response to the predetermined variation to be detected by the image recognition means.

2. The information processing apparatus according to claim 1, wherein said detection means further detects a motion vector of the image data as a variation of the state of the image pickup object.

3. The information processing apparatus according to claim 1, wherein said detection means further detects a variation of the state of the image pickup object based on a predetermined image pattern of the image data.

4. The information processing apparatus according to claim 1, wherein a CCD video camera which forms said image pickup means and a hardware module and a software module which form said detection means and said storage means are integrated in a portable housing.

5. The information processing apparatus according to claim 1, wherein said storage means stores the image data for one frame previously fetched by a predetermined interval of time at a point of time when the trigger signal is supplied from said detection means.

6. The information processing apparatus according to claim 1 wherein said trigger signal is generated in response to a detection of an increase in brightness of the image pickup object.

7. The information processing apparatus according to claim 1, wherein said trigger signal is generated in response to a detection of a decrease in brightness of the image pickup object, and said storage means stores image data captured a predetermined amount of time prior to said detection of a decrease in brightness.

8. The information processing apparatus of claim 1, wherein a user selects the predetermined variation to be detected in advance.

9. An information processing method, comprising the steps of:
   picking up an image of an image pickup object to produce image data;
   delaying transmittal of the image data by a predetermined delay time;
   detecting a predetermined variation in the image pickup object from within the image data from the picking up step and generating a trigger signal in response to the variation detection, wherein the detecting step and the delaying step both receive the image data at substantially the same time;
   fetching, in response to receiving the trigger signal, image data from the delaying step; and
   storing the image data fetched,
   wherein the predetermined delay time is adjusted in response to the predetermined variation to be detected in the detecting step.

10. A computer-readable medium storing a program that causes a computer to execute an information processing program, said information processing program comprising the steps of:
   picking up an image of an image pickup object to produce image data;
   delaying transmittal of the image data by a predetermined delay time;
   detecting a predetermined variation in the image pickup object from within the image data from the picking up step and generating a trigger signal in response to the variation detection, wherein the detecting step and the delaying step both receive the image data at substantially the same time;
   fetching, in response to receiving the trigger signal, image data from the delaying step; and
   storing the image data fetched,
   wherein the predetermined delay time is adjusted in response to the predetermined variation to be detected in the detecting step.

* * * * *